March 1, 1949.  A. DE V. HARNETT  2,463,034
CIRCUIT CONNECTOR
Filed Feb. 27, 1946
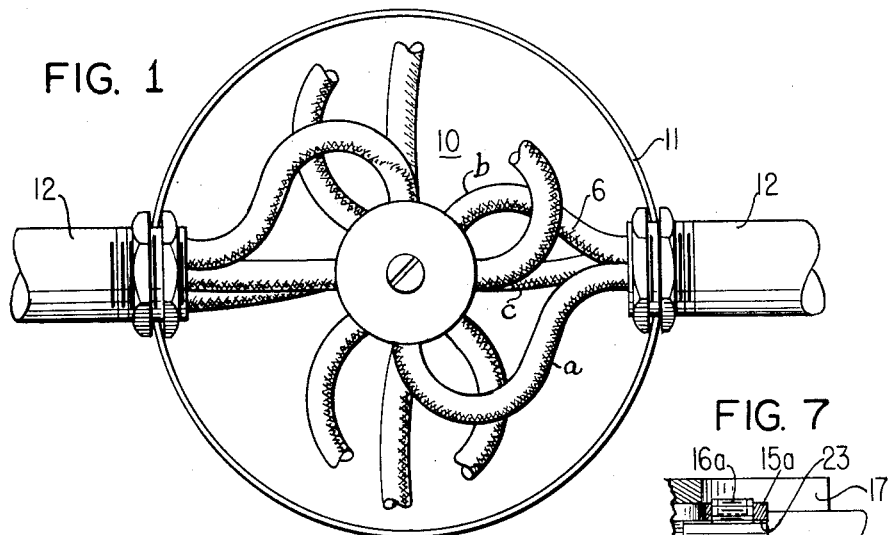
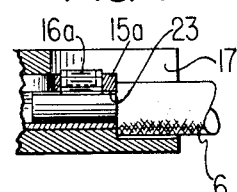
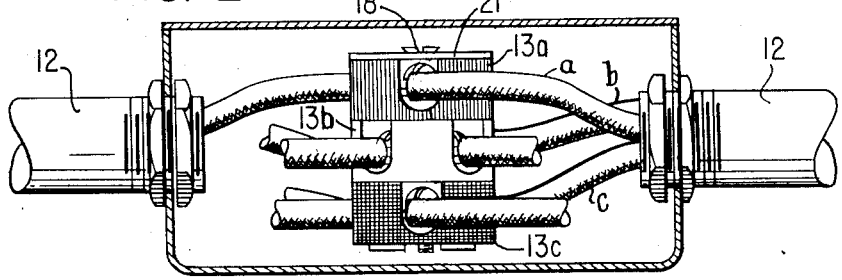
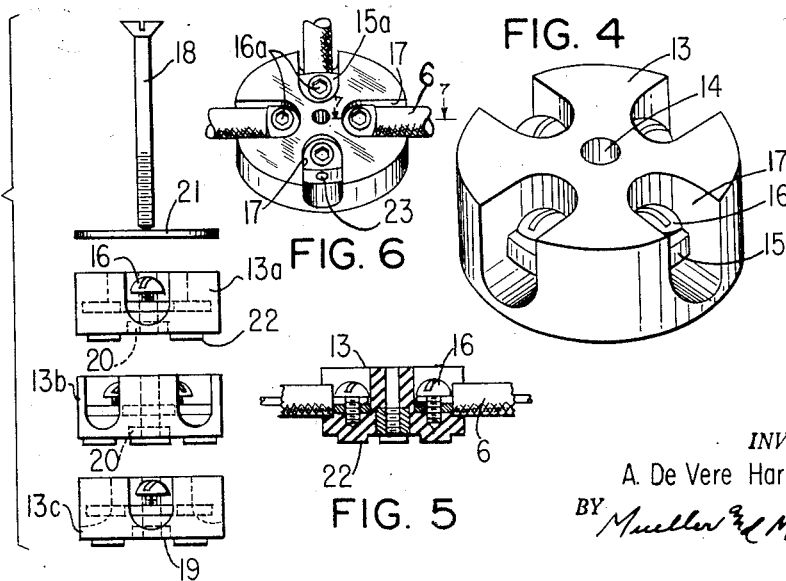
INVENTOR.
A. De Vere Harnett Patented Mar. 1, 1949

2,463,034

UNITED STATES PATENT OFFICE 2,463,034

CIRCUIT CONNECTOR

A. De Vere Harnett, Racine, Wis.

Application February 27, 1946, Serial No. 650,692

4 Claims. (Cl. 173—324)

The present invention relates to electrical circuit connectors and more particularly to an improved multi-circuit connector assembly adapted for use in a conduit box.

It is standard practice in wiring houses and other structures for electrical current distribution to employ conduit boxes for enclosing circuit junctions are formed by mechanically joining the circuit conductors and then soldering and taping the joints. Thereafter the jointed conductor parts are forced into the conduit box and covered by the box lid. This procedure is quite laborious and hence costly, because of the soldering and taping operations involved. Also, when repair is required it is necessary to remove the conductors from the conduit box and remove the tape from the joints to repair the joint or replace a conductor which is also a laborious and time consuming task.

It is, therefore, an object of the present invention to provide an improved circuit connector assembly which permits easy and reliable interconnection of the conductors in a circuit, and yet is small enough to fit in a conduit box of standard size while leaving available within the box adequate room to accommodate substantial segments of the circuit conductors extending to the assembly.

It is another object of this invention to provide a circuit connector for connecting a plurality of conductors which is of simple, rugged, and economical construction and is susceptible of manufacture in production quantities.

It is a further object of this invention to provide a circuit connector assembly of the character described wherein a plurality of connectors may be individually handled in making the desired circuit connections and then stacked on top of each other so that each stacked connector completely insulates the exposed conductive parts of the connector immediately below.

It is still another object of the invention to provide a connector element having a body portion of insulating material and a conducting member embedded therein, together with screw terminals on the conducting member which are displaced radially inward from the edge of the body portion to minimize the likelihood of short-circuiting the circuit conductors and are accessible through open top recesses in the body portion of the element.

In accordance with a still further object of the invention the open top recesses are employed in conjunction with projections extending downward from the bottoms of the molded connector elements to interlock the elements against relative rotation when secured together in stacked relationship.

Further objects, features, and advantages of this invention will become apparent from the following specification taken in connection with the accompanying drawings in which:

Fig. 1 is a top plan view illustrating the present improved connector assembly positioned in a conduit box;

Fig. 2 is a side view of the connector assembly and box shown in Fig. 1;

Fig. 3 is an exploded view showing a plurality of connectors and means for securing them together;

Fig. 4 is an enlarged perspective view showing the details of the circuit connector;

Fig. 5 is a sectional view through one of the connectors;

Fig. 6 is a perspective view illustrating a modified embodiment of the connector; and Fig. 7 is a fragmentary sectional view of the connector shown in Fig. 6.

In practicing the present invention there is provided a circuit connector having an annular body portion molded of insulated material with a conducting ring embedded therein. The conducting ring has a plurality of spaced threaded openings therein for receiving screws for securing the circuit conductors to the conducting ring. The body portion is provided with recesses in the periphery thereof giving access to the screw terminals on the conducting ring. The connectors are constructed to be stacked one on top of the other to form a multi-circuit connector assembly and include projections on the bottoms thereof for interfitting with the recesses in the adjacent connector. They are also provided with central openings for receiving a screw for securing a plurality of connectors together. A disc of insulating material having an opening therein is provided to cover the top member and to form a washer for the head of the screw. The bottom connector is provided with a threaded metallic insert to which the screw is secured.

Referirng now to the drawings, in Figs. 1 and 2 there is illustrated a multi-circuit connector assembly 10 composed of three separate circuit connectors 13 and positioned in a conduit box 11. Conduits 12 are connected to the box and carry conductors $a$, $b$ and $c$ of a three-circuit electrical system. The connector assembly 10 is composed of connectors 13a, 13b and 13c for interconnecting the conductors of circuits $a$, $b$ and $c$, respectively. The connectors may be color-coded (red, white and black, for example) to correspond with the color code of the conductors. The connector assembly is not directly secured to the conduit box but being very light in weight, is held in position by the stiffness of the conductors themselves. A cover, not shown, is ordinarily provided for the conduit box.

For details of the construction of the connectors, reference is made to Fig. 4 in which the connector 13 is shown as having an annular body portion molded of insulating material with a central opening 14 therein and a conducting ring 15 molded therein. Screw terminals 16 are threaded into openings in the conducting ring 15, permitting easy connection of circuit conductors thereto. Open-top recesses 17 are provided in the body portion of the connector to permit easy access to the terminals 16.

Reference is now made to Fig. 3 in which the manner of securing the three connectors 13a, 13b and 13c together to form a connector assembly for use in a three wire system is shown. A bolt 18 is provided to be positioned in the central openings 14 of the connectors and is adapted to be threaded into a metal insert 19 in the connector 13c. Inserts 20 having openings of sufficient size to accept the bolt 18 are provided in the connectors 13a and 13b to maintain the connectors axially aligned. The inserts 19 and 20 are positioned in the insulating body of the connector in such a way that they will be insulated from the conducting ring so that the bolt 18 will at all times be insulated from the circuits. An insulating washer 21 is also provided in the assembly completely to cover and insulate the recesses in the top connector 13a and to form a washer for the bolt 18. Projections 22 are provided on the bottom of each of the connectors for fitting in the recesses 17 to position the connectors relative to each other when stacked together to form a multi-circuit connector and to prevent relative rotation between the connectors. As best shown in Figs. 1 and 3 of the drawings, the projections are so positioned that, when the connectors are stacked together, the recesses will be staggered to provide more room for the conductors.

In order to eliminate the necessity for forming screw receiving eyes in the ends of the conductors connected to the rings 15, the modified structure illustrated in Figs. 6 and 7 may be employed. As there shown, a conductive ring 15a of substantially greater thickness than the largest diameter wire is embedded in the annular body of insulating material. This ring, within the recesses 17 is drilled and tapped from the top to receive Allen screws 16a. Along the edges thereof, the ring 15a is also drilled radially inward to provide conductor receiving passages 23 which intersect and extend inwardly beyond the downwardly extending screw receiving passages. These passages are of sufficiently large diameter to accommodate the heaviest gauge wire which the connectors are adapted to interconnect.

With the described modified connector structure, a connection may easily be made at each recess 17 by backing the screw 16a partially out of its threaded opening in the ring 15a, inserting the stripped end of a conductor into the associated edge opening 23 and then tightening the screw to clamp the conductor end in place, all in the manner best illustrated in Fig. 7 of the drawings. Preferably the conductor insulation is only stripped back far enough so that when the conductor end is inserted in the opening 23, the end of the insulation will butt against the edge of the ring 15a. When this procedure is followed, all portions of the conductor outside of the recess 17 are insulated to preclude any likelihood of short circuits.

Although an assembly has been described in which three connectors are used together, it will be apparent that more or fewer connectors can be used by providing bolts 18 of various lengths. The only factor limiting the number of connectors used together is the amount of space available in the conduit box. As can be seen the various connectors can all be made in the same mold and are identical except for color and the inserts used therein. It is further apparent that the connectors can be made entirely identical by eliminating the color coding and the metallic inserts. In such case, a separate nut can be provided for engaging the threads of the bolt for securing the connectors together.

As a connector such as described is a much used item and a very large number will be required, the cost thereof will be very small, especially since the connectors are suitable for production manufacturing methods. It is apparent that a great saving of time will result in using these connectors instead of soldering and tapping the conductors as is customary in the prior art. Wiring of the connectors is facilitated by the fact that the connectors may be handled on an individual basis during wiring, following which the connectors are secured together and placed in the conduit box. Moreover, by disposing the terminal points of the conductive rings 15 radially inward from the edges of the insulating bodies, and butting the end of the conductor insulation directly against conductive rings 15 in the manner best shown in Figs. 5 and 7 of the drawings, each connector serves to insulate the terminal points of the connector below and all exposed conductive parts are effectively disposed within the recesses 17, such that the possibility of short circuits is substantially eliminated. In this regard it is pointed out that the terminal screws 16 are of such length that they cannot be fully unscrewed from the conductive rings 15 when the connectors are clamped together in stacked relationship in the manner shown in Fig. 2 of the drawings. Specifically, the connector 13b prevents the terminal screws 16 of the connector 13c from becoming fully unscrewed from the conductive ring 15 in the latter connector; the connector 13c similarly blocks the terminal screws of the connector 13b; and the insulating washer 21 similarly acts as a stop for the terminal screws of the top connector 13a. Thus with the connectors assembled, all exposed conductive parts are fully insulated from each other and from the conduit box, and there is no possibility of the parts working loose. Moreover, when repair of the wiring is necessary, the conductors may be very easily disconnected, the color coding of the connectors facilitating location of the circuit desired.

Although the invention has been described with reference to a particular embodiment thereof, it will be apparent that various modifications may be made therein which are within the scope of the invention as defined in the appended claims.

I claim:

1. A connector assembly for connecting the conductors of a plurality of circuits comprising a number of connector units corresponding to the number of circuits to be connected and adapted to be stacked one on top of the other, said connector units respectively including insulating body members, conducting elements embedded in said body members and provided with spaced terminal means on said conducting elements, each of said body members having spaced openings therein for rendering said terminal means accessible from the side and top of said body member and having a projection on the bottom thereof for interfitting with a top opening of the next lower member when the members are stacked one on top of the other whereby the top openings of the lower member are covered by the upper member and relative rotation between members is prevented, and means for holding said members in stacked relationship.

2. A multi-circuit connector assembly comprising a plurality of insulating members adapted to be stacked one on top of the other and conducting elements having terminal means thereon embedded in said insulating members, said insulating members having recesses therein for rendering said terminal means accessible from the side and top of said member and having projections from the bottom thereof for interfitting with the top recesses of the next lower member whereby relative rotation between members is prevented when the members are in stacked relationship, said projections being offset with respect to the recesses in said insulating members whereby the recesses of said insulating members are staggered when the members are stacked together, and means for securing said insulating members together.

3. A connector assembly for connecting the conductors of a plurality of circuits comprising, a number of connector units corresponding to the number of circuits to be connected and adapted to be stacked one on top of the other, said connector units respectively including insulating body members, conducting elements embedded in said insulating members and provided with spaced terminal means on said conducting elements, each of said insulating members having spaced recesses therein for rendering said terminal means accessible from the side and top of said member and including projections from the bottom thereof for interfitting with the top recesses of the next lower member when the members are stacked one on top of the other whereby the top recesses of the lower member are covered by the upper member and relative rotation between members is prevented, means for holding said members in stacked relationship, and insulating means held in place by said last named means for covering the top recesses in the insulating member of the uppermost connector.

4. A circuit connector comprising an insulating body member, a conducting element embedded in said insulating member and provided with wire receiving openings extending inwardly from the outer edge thereof at spaced points therearound, and screws threaded into said element from the top thereof clampingly to engage wires thrust into said wire receiving openings, said insulating member having openings therein for rendering said wire receiving openings and screws accessible from the side and top of said member, respectively, and being provided with projections spaced apart around the bottom thereof for interfitting with the top openings in the insulating member of a similar circuit connector whereby the top openings of the lower member are covered by the upper member and relative rotation between members is prevented when the members are stacked one on top of the other, said projections being offset relative to the wire receiving openings of said conducting element to provide for staggering of the wires connected to two stacked circuit connectors.

A. DE VERE HARNETT.

REFERENCES CITED

The following references are of record in the file of this patent:

UNITED STATES PATENTS

| Number | Name | Date |
|---|---|---|
| 679,057 | Meehan | July 23, 1901 |
| 1,224,971 | Skinner | May 8, 1917 |
| 1,517,017 | Roth | Nov. 25, 1924 |
| 1,586,709 | Schwinger | June 1, 1926 |

FOREIGN PATENTS

| Number | Country | Date |
|---|---|---|
| 217,842 | Great Britain | June 26, 1924 |